(12) United States Patent
Armando et al.

(10) Patent No.: US 10,765,065 B2
(45) Date of Patent: Sep. 8, 2020

(54) TELESCOPIC REEL FOR HARVESTING MACHINE

(71) Applicant: STW S.R.L., Cuneo (IT)

(72) Inventors: Lodovico Armando, Cervasca (IT); Livio Bongiovanni, Cuneo (IT)

(73) Assignee: STW S.R.L., Cuneo (IT)

( * ) Notice: Subject to any disclaimer, the term of this patent is extended or adjusted under 35 U.S.C. 154(b) by 343 days.

(21) Appl. No.: 15/735,131

(22) PCT Filed: Jun. 9, 2016

(86) PCT No.: PCT/IB2016/053411
§ 371 (c)(1),
(2) Date: Dec. 8, 2017

(87) PCT Pub. No.: WO2016/199070
PCT Pub. Date: Dec. 15, 2016

(65) Prior Publication Data
US 2018/0177131 A1    Jun. 28, 2018

(30) Foreign Application Priority Data

Jun. 11, 2015  (IT) .................. 102015000022917

(51) Int. Cl.
*A01D 57/04* (2006.01)
*A01D 57/02* (2006.01)
*A01D 69/06* (2006.01)

(52) U.S. Cl.
CPC ............. *A01D 57/04* (2013.01); *A01D 57/02* (2013.01); *A01D 69/06* (2013.01)

(58) Field of Classification Search
CPC ........ A01D 57/04; A01D 57/02; A01D 69/06; A01D 57/03
(Continued)

(56) References Cited

U.S. PATENT DOCUMENTS 2,008,470 A * 7/1935 Rall ....................... A01D 57/06
56/219
2,454,063 A * 11/1948 Irvine .................... A01D 57/06
56/219
(Continued)

FOREIGN PATENT DOCUMENTS

BE          660212     6/1965
CN         1656869 A   8/2005
(Continued)

OTHER PUBLICATIONS

International Search Report dated Sep. 6, 2016, issued in PCT Application No. PCT/IB2016/053411, filed Jun. 9, 2016.
(Continued)

*Primary Examiner* — Arpad Fabian-Kovacs
(74) *Attorney, Agent, or Firm* — Workman Nydegger

(57) ABSTRACT

A telescopic reel includes a telescopic supporting frame and a central module including at least one bracket constrained to the supporting frame and connectable to a bearing and guide through a fastener. The bearing and guide is adapted to bear and guide, during its rotary motion, at least one transversal intersection element of the reel. The bearing and guide is positioned on the at least one intersection element at a first distance from a longitudinal central shaft of the reel, the first distance being greater than or equal to a second distance between the central shaft and a crosspiece of the reel.

10 Claims, 4 Drawing Sheets

(58) Field of Classification Search
USPC .................................. 56/220, 14.4, 221, 364
See application file for complete search history.

(56) References Cited

U.S. PATENT DOCUMENTS

| | | | |
|---|---|---|---|
| 3,258,901 A | 7/1966 | Van Der Lely et al. | |
| 3,555,796 A * | 1/1971 | Baumeister | A01D 57/02 56/221 |
| 3,561,198 A | 2/1971 | Herbsthofer | |
| 3,638,408 A * | 2/1972 | Swanson | A01D 57/03 56/219 |
| 3,771,299 A * | 11/1973 | Gradwohl | A01D 57/03 56/220 |
| 4,068,454 A * | 1/1978 | Webb | A01D 57/03 56/220 |
| 4,184,314 A * | 1/1980 | Hobbs | A01D 29/00 56/10.3 |
| 4,487,004 A * | 12/1984 | Kejr | A01D 41/14 56/14.4 |
| 4,833,869 A | 5/1989 | Klein | |
| 4,910,946 A * | 3/1990 | Underwood | A01D 34/30 56/14.4 |
| 5,350,020 A | 9/1994 | Vandever et al. | |
| 6,453,655 B2 * | 9/2002 | Ferraris | A01D 57/03 56/126 |
| 7,165,385 B2 * | 1/2007 | Lanzinger | A01D 57/02 56/220 |
| 7,426,817 B2 | 9/2008 | Coers | |
| 9,376,261 B1 * | 6/2016 | Miller | E01H 5/076 |
| 9,392,745 B2 * | 7/2016 | Bertino | A01D 34/06 |
| 2007/0204583 A1 | 9/2007 | Coers | |
| 2012/0047867 A1 * | 3/2012 | Coers | A01D 57/02 56/220 |
| 2013/0160418 A1 | 6/2013 | Sauerwein et al. | |
| 2014/0116019 A1 * | 5/2014 | Pierson | A01D 57/02 56/226 |
| 2016/0066510 A1 * | 3/2016 | Cook | A01D 57/02 56/222 |
| 2016/0183465 A1 * | 6/2016 | Honey | A01D 57/12 56/226 |
| 2016/0309651 A1 * | 10/2016 | Remillard | A01D 57/02 |
| 2017/0055450 A1 * | 3/2017 | Jasper | A01D 57/02 |
| 2017/0059027 A1 * | 3/2017 | Jasper | A01D 57/03 |
| 2019/0082599 A1 * | 3/2019 | Cook | A01D 57/03 |

FOREIGN PATENT DOCUMENTS

| | | | |
|---|---|---|---|
| CN | 103688672 A | 4/2014 | |
| GB | 2 164 537 A | 3/1986 | |
| KR | 2019112343 A * | 10/2019 | A01D 41/14 |

OTHER PUBLICATIONS

International Preliminary Report on Patentability dated Dec. 12, 2017, issued in PCT Application No. PCT/IB2016/053411, filed Jun. 9, 2016.
Chinese Office Action dated Apr. 22, 2020, issued in Chinese Application No. 201680033849.6.

* cited by examiner

TELESCOPIC REEL FOR HARVESTING MACHINE

BACKGROUND OF THE INVENTION

1. The Field of the Invention

The present invention relates to an improved telescopic reel.

2. The Relevant Technology

By definition, a reel is that part of the cutting platform of a harvesting machine which is located at the front end thereof. The task of the reel is to accompany, lift from the ground and convey the product, during the harvest, towards the cutting part of the cutting platform for cereals, soy bean, rape, rice and other agricultural products. A reel generally comprises a plurality of crosspieces whereto spring-loaded teeth used for lifting the crop are anchored.

Telescopic reels are known in the field of agricultural machinery; in particular, United States patent document U.S. Pat. No. 3,561,198 discloses a telescopic reel wherein the cross-members making up the reel are inserted into each other to allow the reel to take a retracted position and an extended position.

United States patent document U.S. Pat. No. 5,350,020 discloses a crop lifting system including a reel connected to a frame supported by two hydraulically controlled arms. The frame is connected to the reel at its central shaft; therefore, the rotary motion of the reel, when in operation, is directly imparted to the central shaft, in particular to both ends of the shaft. United States patent document U.S. Pat. No. 7,426,817 discloses a fixed reel, i.e., a non-telescopic one, comprising two reel parts connected to each other at a central point of the central shaft of the reel. Motion is imparted to the reel in the central region thereof, in particular directly to the central shaft of the reel.

However, such a configuration does not provide spatial continuity of the crosspieces, which leads to the problem that in the discontinuity zone there are no teeth for lifting the crop, resulting in poor crop lifting performance during the harvesting operations.

SUMMARY OF THE INVENTION

It is therefore one object of the present invention to provide an improved telescopic reel that allows lifting the crop more efficiently.

It is a second object of the present invention to provide an improved telescopic reel that allows improving the motion of the reel itself.

It is a further object of the present invention to provide an improved telescopic reel that may have any length, in particular greater than ten metres.

These and other objects of the invention are achieved through an improved telescopic reel as claimed in the appended claims, which are an integral part of the present description.

In brief, an improved telescopic reel is described, which comprises a telescopic supporting frame and a central module comprising at least one bracket constrained to said supporting frame and connectable to bearing and/or guiding means through fastening means. The bearing and/or guiding means are adapted to bear and guide, during its rotary motion, at least one transversal intersection element of said reel; said bearing and/or guiding means being positioned on said at least one intersection element at a first distance from a longitudinal central shaft of the reel, said first distance being greater than or equal to a second distance between said central shaft and a crosspiece of the reel.

BRIEF DESCRIPTION OF THE DRAWINGS

The above objects will become more apparent from the following detailed description of an improved telescopic reel according to the present invention, with particular reference to the annexed drawings, wherein.

DETAILED DESCRIPTION OF THE PREFERRED EMBODIMENTS

Figure 1:
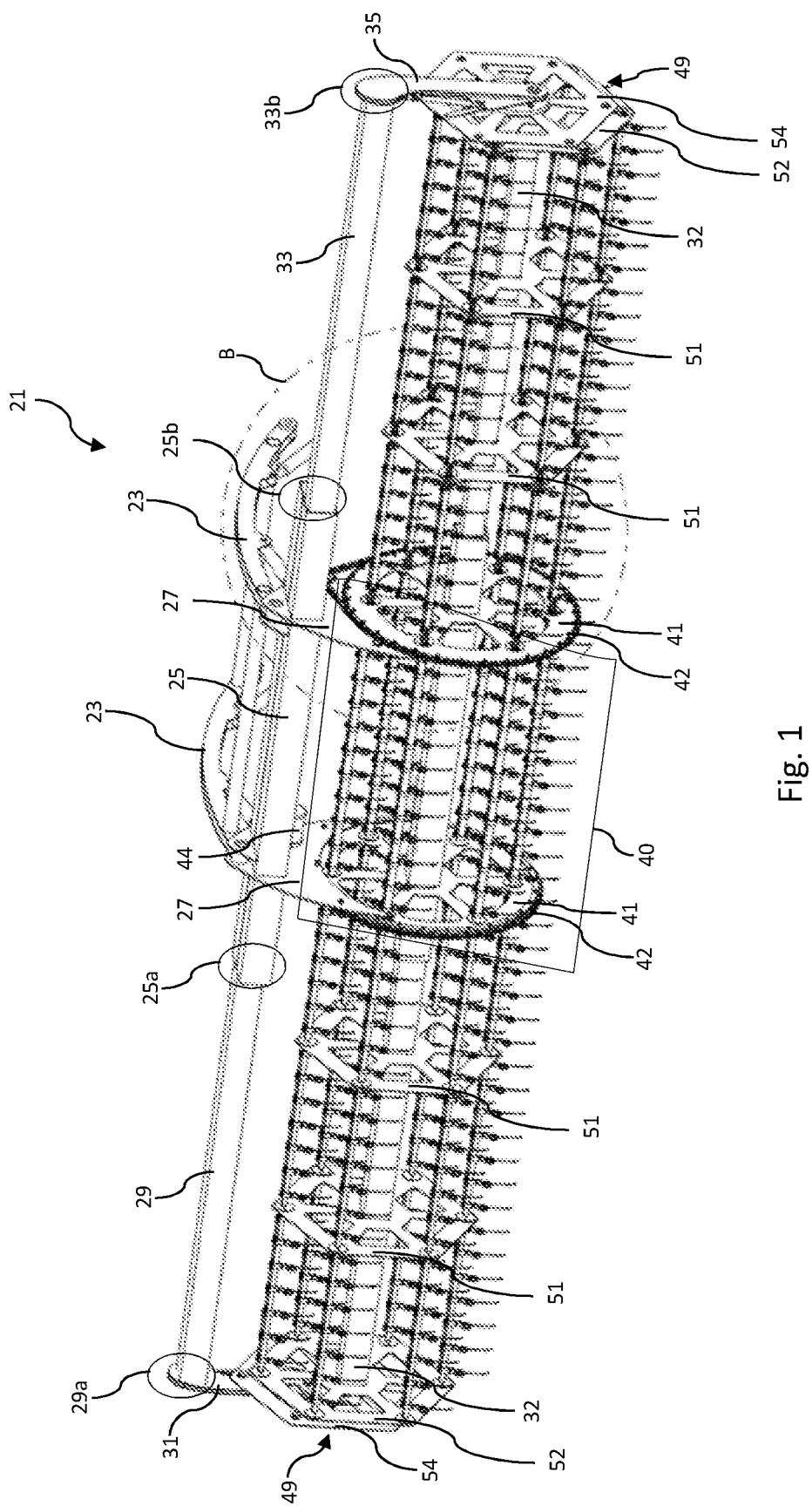
FIG. 1 shows one example of a telescopic reel according to the present invention in an open position.

With reference to FIG. 1, there is shown one example of a reel 21 according to the present invention.

The reel 21 is connected to supporting forks 23, preferably consisting of a structure made up of two tubular pieces having a parabolic shape, connected to each other near two ends thereof by means of two crosspieces having a cylindrical cross-section. As an alternative, said two crosspieces of the supporting forks 23 may have any cross-section.

Two hubs are welded to one end of the two tubular pieces to allow the reel 21 to be rotated or lifted on pins through the use of two hydraulic cylinders. The supporting forks 23, unlike the conventional solutions known in the art, are connectable in the central part of the reel 21. It must be pointed out that the supporting forks 23 do not belong to the reel 21, but can be connected thereto; for instance, the supporting forks 23 can be the means of connection between the reel 21 and a harvesting machine.

The reel 21 comprises a telescopic supporting frame 25, which is preferably made up of two tubular elements coupled together by a longitudinal weld along the tubular elements themselves. In the upper part of the telescopic supporting frame 25 there is at least one anchoring bracket, to which a hub belonging to the supporting forks 23 can be connected by means of pins.

At a first end 25a of the telescopic supporting frame 25 there is a first telescopic element 29, which preferably consists of a tubular element so sized as to be able to enter and slide on a suitable guide or slider within a portion of the telescopic supporting frame 25.

To a first end 29a of the first telescopic element 29 an anchoring bracket 31 is connected for supporting a central shaft 32 of the reel 21.

At a second end 25b of the telescopic supporting frame 25 there is a second telescopic element 33, which preferably consists of a tubular element so sized as to be able to enter and slide on a suitable guide or slider within a portion of the telescopic supporting frame 25.

To a first end 33b of the second telescopic element 33 a first anchoring bracket 35 is connected for supporting the central shaft 32 of the reel 21.

In other words, the reel 21 is symmetrical with respect to its transverse axis of symmetry.

A peculiarity of the telescopic reel according to the present invention is that the reel 21 comprises the telescopic supporting frame 25 and a central module 40 comprising at least one bracket 27 constrained to said supporting frame 25 and connectable to bearing and/or guiding means 28 through fastening means 34. The bearing and/or guiding means 28 are adapted to bear and guide, during its rotary motion, at least one transversal intersection element 41 of said reel 21; said bearing and/or guiding means 28 are positioned on said at least one intersection element 41 at a first distance from a longitudinal central shaft 32 of the reel 21, said first distance being greater than or equal to a second distance between said longitudinal central shaft 32 and a crosspiece 47 of the reel 21.

The at least one intersection element 41 comprises drive means 41 capable of receiving motion through motion transmission means 42 connected thereto. The motion transmission means 42 are also connectable to a motor 44, and operate in proximity to the first distance.

The drive means 41 comprise at least one toothed wheel, disk, pulley, thrust block, or the like. In a preferred embodiment of the invention, i.e., the one shown in FIG. 1, the drive means 41 comprise two toothed wheels 41 capable of receiving motion, or drive force, through the motion transmission means 42 connected thereto, e.g., a chain, a rubber belt, a gear, or the like.

Furthermore, the motion transmission means 42 operate in proximity to the first distance, i.e., near the perimeter of the at least one intersection element 41, in particular of the drive means 41.

Figure 2A:
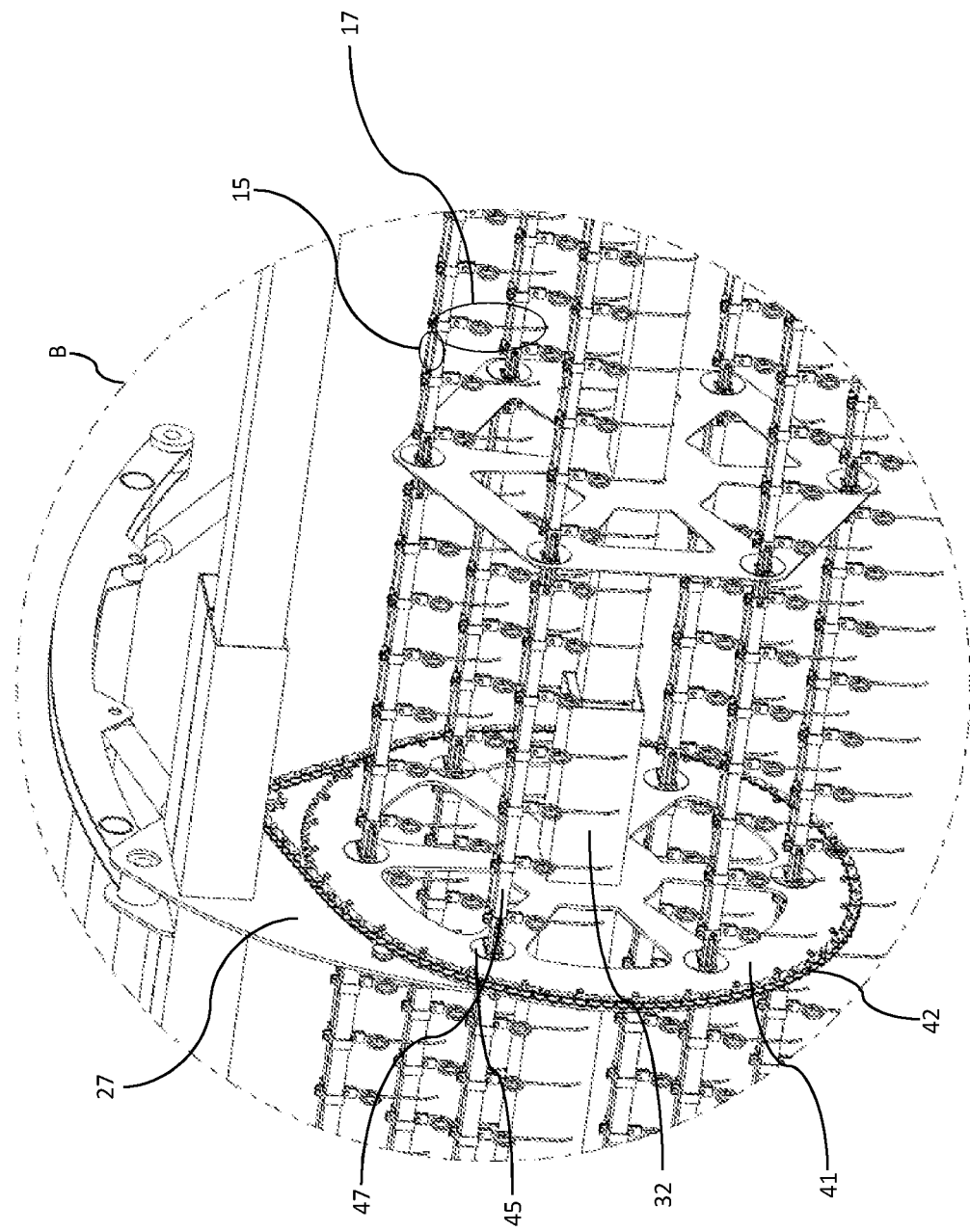
FIGS. 2A, 2B and 2C show some peculiar elements of a telescopic reel according to the present invention.
Figure 2B:
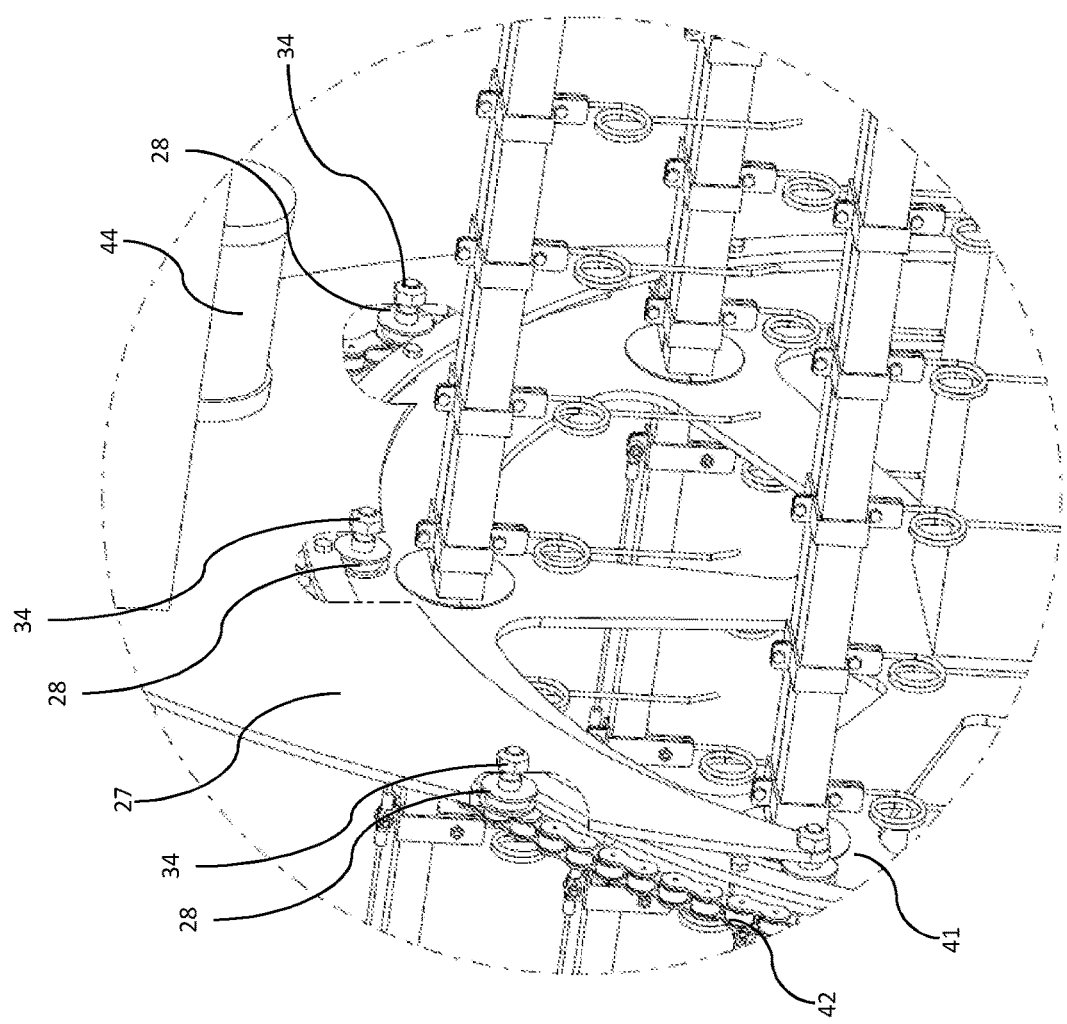
Figure 2C:
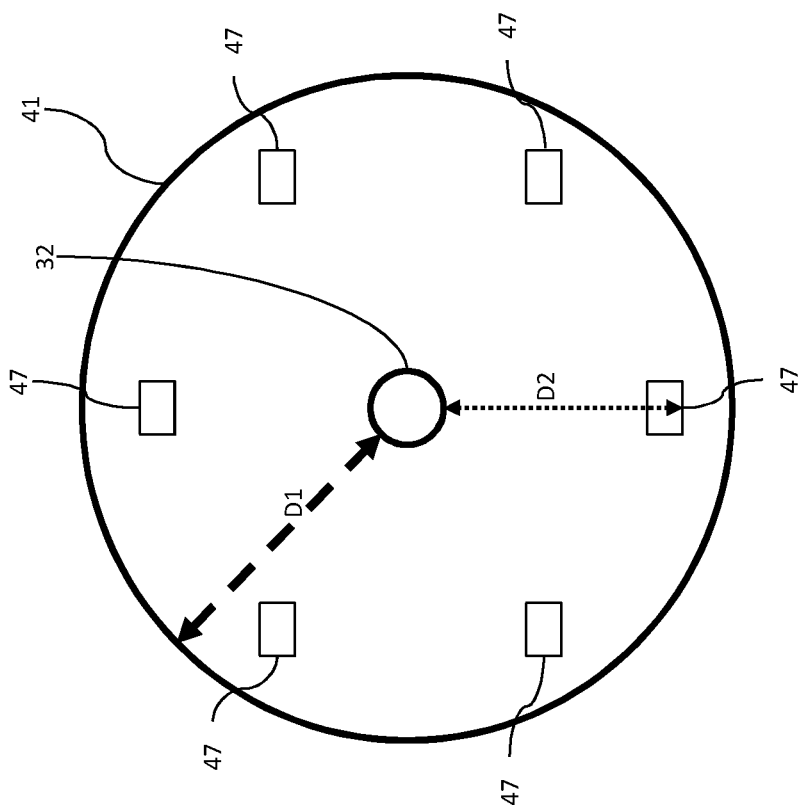

In fact, with particular reference to FIGS. 2A, 2B and 2C, if we consider that the motion transmission means 42 comprise a chain and that the drive means 41 comprise the toothed wheels 41, it is clear that the chain will act upon the toothed part of the toothed wheel that is located at a first distance D1 greater than or equal to a second distance D2 between the central longitudinal shaft 32 and the outer part of the crosspiece 47 of the reel 21. The same will apply in case of pulley-belt, gear-chain, gear-gear, worm screw-gear or similar couplings.

In other words, the radius D1 of the drive means 41 is greater than or equal to the second distance D2 between the central shaft 32 and the outer side of the crosspieces 47 of the reel 21.

The distance between the two toothed wheels 41 may vary according to the desired dimensions of the reel 21.

The at least one bracket 27, the function of which is to follow and support the rotation of the reel 21, preferably has a semicircular shape that matches the shape of the drive means 41.

More in detail, the at least one bracket 27 is connectable to, or comprises, the supporting and/or guiding means 28 (see FIG. 2B), in particular bearings anchored to the at least one bracket 27 via the fastening means 34, e.g., bolts or the like. The supporting and/or guiding means 28 bear the drive means 41 in proximity to the first distance D1, which is calculated with respect to the position of the central shaft 32, or in proximity to an outer perimeter thereof, and further allow it to rotate, i.e., they guide the drive means 41 during their motion. More in detail, the supporting and/or guiding means 28 act upon, i.e., impart motion to, a protruding portion of the drive means 41. Such protruding portion is located, or associated, in proximity to the perimeter of the drive means 41, in particular a toothed wheel, and can be considered as an element integrated with the toothed wheel as one piece, or else it may be a separate element which is then associated with said toothed wheel.

The motion transmission means 42 are connected to a motor 44, which is preferably constrained to the telescopic supporting frame 25. The motor 44 may be electric/electronic, hydraulic, etc.

In an alternative configuration, it is conceivable that the supporting and/or guiding means 28 are connected to the motor 44, thus allowing the drive means 41 to rotate. In this case, one or more bearings 28 will be connected to the motor 44 via motion transmission belts, and therefore the same bearings 28 will support, guide and drive the entire reel 21.

With particular reference to FIG. 2A, there is shown an enlarged view of a portion B of the reel 21 of FIG. 1. The drive means 41 are fastened to the central shaft 32 of the reel 21. The central shaft 32 is telescopic, i.e., it is preferably made up of one or more tubular elements having a cavity into which further tubular elements can be inserted, in particular those belonging to the side modules of the reel 21. The central shaft 32 is preferably welded to the drive means 41 in a central position thereof.

The telescopic crosspieces 47 are shown in their open position, i.e., they are totally extended relative to each other. On the contrary, the crosspieces of the central module 40 are fixed and comprise a cavity for receiving the crosspieces 47 of the side modules of the reel 21.

Referring back to FIG. 1, pins are secured, in particular welded by means of centering flanges internal to the tubular elements, to the outer ends 49 of the tubular elements of the side modules, which pins are adapted to enter into bearings arranged on the end of the first telescopic element 29 and second telescopic element 33.

To each one of the outer ends 49 of the tubular elements of the side modules a fixed flange 52, or disk, is secured, which preferably has an hexagonal shape and is provided with seats for fitting the bushing supports 45, in particular in proximity to the corners of the hexagon (see in particular FIG. 2A).

In other words, the reel 21 is telescopic because the crosspieces 47 of the side modules are adapted to enter into the crosspieces of the central module 40 and one into the other, so as to form a single telescopic body capable of transmitting a homogeneous rotary motion over the entire width of the reel 21. Furthermore, as already mentioned, the central shaft 32 is telescopic as well.

The reel 21 further comprises sliding flanges 51, preferably hexagonal in shape, essentially equidistant in the space comprised between the central module 40 and the outer ends 49 of the reel 21.

Said sliding flanges 51 are characterized in that they can slide along the crosspieces 47 and the central shaft 32 as the reel 21 is opened or closed, while providing a supporting, driving and centering function when the reel is in operation. Near their respective outer corners, the sliding flanges 51 have coaxial seats for the bushing supports 45.

At the outer ends 49 there are also eccentric flanges 54 connected to the anchoring brackets 31,35, and therefore to the telescopic supporting frame 25. Moreover, the eccentric flanges 54 are connected to the fixed flanges 52 by means of a linkage.

In the present description, the transversal intersection elements 41,51,52 of the reel 21 comprise the drive means 41, the sliding flanges 51 and the fixed flanges 52, in that they are arranged in a substantially transverse manner relative to the longitudinal axis of the reel 21.

The features of the present invention, as well as the advantages thereof, are apparent from the above description.

A first advantage of the present invention is that it ensures better crop lifting performance, because the spring-loaded teeth are arranged along the whole usable surface of the crosspieces and there is no discontinuity.

A second advantage of the present invention is that it improves the motion of the reel itself.

A further advantage of the present invention is that the telescopic reel may have any length, in particular greater than ten metres.

The improved telescopic reel according to the present invention may be subject to many possible variations without departing from the novelty spirit of the inventive idea; it is also clear that in the practical implementation of the invention the illustrated details may have different shapes or be replaced with other technically equivalent elements.

It can therefore be easily understood that the present invention is not limited to the above-described improved telescopic reel according to the present invention, but may be subject to many modifications, improvements or replacements of equivalent parts and elements without departing from the novelty spirit of the inventive idea, as clearly specified in the following claims.

The invention claimed is:

1. A telescopic reel comprising:
   a supporting frame having a length extending between a first end and an opposing second end of the reel, said support frame being telescopic so that said length is adjustable by one portion of the support frame being slidable within another portion of the support frame; and
   a central module disposed centrally along said support frame, comprising:
      at least one bracket constrained to said supporting frame;
      at least one transversal intersection element being rotatable relative to said at least one bracket; and
      bearing and guiding means through for bearing and guiding said at least one transversal intersection element during its rotary motion relative to said at least one bracket, said bearing and guide means be connected to said bracket by fastening means;
   a longitudinal central shaft extending between said first end and said opposing second end of the reel and extending laterally and centrally from said at least one transversal intersection element;
   said bearing and guiding means being positioned on said at least one intersection element at a first radial distance from said longitudinal central shaft; and
   a cross piece extending between said first end and said opposing second end of the reel and extending lateral to said at least one transversal intersection element at a second radial distance from said longitudinal central shaft, said first radial distance being greater than or equal to said second radial distance.

2. The telescopic reel according to claim 1, wherein said at least one intersection element comprises drive means capable of receiving motion through motion transmission means connected thereto; said motion transmission means being connectable to a motor and acting upon said drive means in proximity to said first radial distance.

3. The telescopic reel according to claim 1, wherein said bearing and guiding means are connected to a motor and allow the rotation of said at least one intersection element.

4. The telescopic reel according to claim 2, wherein said drive means comprise at least one element selected from the group including: a toothed wheel, a disk, a gear, a pulley, a thrust block.

5. The telescopic reel according to claim 2, wherein said motion transmission means comprise at least one element selected from the group including: a chain, a rubber belt, a gear.

6. The telescopic reel according to claim 1, wherein said bearing and guiding means comprise bearings.

7. The telescopic reel according to claim 1, wherein said fastening means comprise bolts.

8. The telescopic reel according to claim 2, wherein said at least one transversal intersection elements comprises said drive means, sliding flanges and fixed flanges.

9. The telescopic reel according to claim 1, wherein said longitudinal central shaft is telescopic so that a length of said central shaft is adjustable by one portion of said central shaft being slidable within another portion of said central shaft.

10. The telescopic reel according to claim 1, wherein said bearing and guiding means are configured so as to be retained at a constant radius from said central shaft as said transversal intersection element is rotated relative to said at least one bracket.

* * * * *